(12) United States Patent
Maschwitz

(10) Patent No.: US 7,507,478 B2
(45) Date of Patent: Mar. 24, 2009

(54) HEAT STABILIZED SUB-STOICHIOMETRIC DIELECTRICS

(75) Inventor: Peter Maschwitz, Sebastopol, CA (US)

(73) Assignee: AGC Flat Glass North America, Inc., Kingsport, TN (US)

( * ) Notice: Subject to any disclaimer, the term of this patent is extended or adjusted under 35 U.S.C. 154(b) by 342 days.

(21) Appl. No.: 11/065,038

(22) Filed: Feb. 25, 2005

(65) Prior Publication Data

US 2005/0186482 A1    Aug. 25, 2005

Related U.S. Application Data

(60) Provisional application No. 60/547,077, filed on Feb. 25, 2004.

(51) Int. Cl.
*B32B 17/06*    (2006.01)
(52) U.S. Cl. .................. 428/428; 428/432; 428/697; 428/698; 428/699; 428/701; 428/702; 428/704
(58) Field of Classification Search .......... 428/426, 428/428, 432, 697, 698, 699, 701, 702, 704
See application file for complete search history.

(56) References Cited

U.S. PATENT DOCUMENTS

| | | | |
|---|---|---|---|
| 5,935,702 A | 8/1999 | Macquart et al. | |
| 6,132,881 A | 10/2000 | Hartig et al. | |
| 6,399,228 B1 | 6/2002 | Simpson | |
| 6,445,503 B1 | 9/2002 | Lingle | |
| 6,495,251 B1 | 12/2002 | Arbab et al. | |
| 6,495,263 B2 | 12/2002 | Stachowiak | |
| 6,576,349 B2 | 6/2003 | Lingle et al. | |
| 6,582,809 B2 | 6/2003 | Boire et al. | |
| 6,589,658 B1 * | 7/2003 | Stachowiak | 428/432 |
| 6,602,608 B2 | 8/2003 | Stachowiak | |
| 6,749,941 B2 | 6/2004 | Lingle | |
| 2002/0192474 A1 | 12/2002 | Lingle | |
| 2003/0049464 A1 * | 3/2003 | Glenn et al. | 428/432 |
| 2003/0235719 A1 | 12/2003 | Grimal et al. | |

FOREIGN PATENT DOCUMENTS

| | | |
|---|---|---|
| EP | 0 908 421 A2 | 4/1999 |
| WO | WO 03/048060 | 6/2003 |

* cited by examiner

*Primary Examiner*—Ling Xu
(74) *Attorney, Agent, or Firm*—Oblon, Spivak, McClelland, Maier & Neustadt, P.C.

(57) ABSTRACT

A sub-stoichiometric oxide, nitride or oxynitride layer in an optical stack, alone or in direct contact with one or two stabilizing layers, stabilizes the optical properties of the stack. The stabilizing layer(s) can stabilize the chemistry and optical properties of the sub-stoichiometric layer during heating. The change in optical characteristics of the sub-stoichiometric layer upon heating can counter the change in optical characteristics of the rest of the optical stack.

36 Claims, 5 Drawing Sheets

HEAT STABILIZED SUB-STOICHIOMETRIC DIELECTRICS

BACKGROUND OF THE INVENTION

1. Field of the Invention

The present invention relates to sub-stoichiometric dielectric materials. In particular, the present invention relates to sub-stoichiometric dielectric material layers used in optical stacks formed on transparent substrates.

2. Discussion of the Background

Sub-stoichiometric dielectrics are well known in the field of thin films and optical coatings. These sub-stoichiometric materials are typically substances, based on metals, silicon or germanium, that are less than fully reacted with oxygen or nitrogen. Frequently, these materials are optically absorbing in the visible wavelengths while the fully reacted corresponding compounds are often optically non-absorbing in the visible wavelengths.

Sub-stoichiometric materials in thin film form are often included into optical stacks. Compared to stoichiometric dielectric compounds, sub-stoichiometric dielectric materials have a number of desirable properties.

For example, a sub-stoichiometric dielectric generally has a higher index of refraction ("n") than the corresponding stoichiometric dielectric, and may provide an optical stack with optical properties that are more difficult to reach with all lower index stoichiometric layers. The higher index of the sub-stoichiometric dielectric often allows the sub-stoichiometric layer to be thinner than the corresponding stoichiometric dielectric.

A sub-stoichiometric layer also generally has a higher extinction coefficient ("k") than the corresponding stoichiometric dielectric. As a result, sub-stoichiometric dielectric materials allow optical stacks to achieve optical properties that cannot be reached with non-absorbing stoichiometric dielectric compounds only.

Thin films of metal sub-oxides and sub-nitrides generally have better properties as chemical barriers than the corresponding stoichiometric metal oxides and nitrides. Barrier layers of metal sub-oxides and sub-nitrides are useful in optical stacks to protect vulnerable metal layers from corrosion. The barrier layers reduce diffusion into the stack of reactive materials such as water or oxygen.

Deposition rates are usually higher for sub-stoichiometric oxide and nitride materials than for stoichiometric materials. As a result, the use of sub-stoichiometric layers typically decreases production costs for manufacturing thin film coatings. This is true for most sputtering and evaporation processes.

For some optical designs, it is desirable to block transmission of UV light. Most sub-stoichiometric materials tend to be more absorbing in the UV wavelengths than the corresponding stoichiometric compounds.

An undesirable property of sub-stoichiometric thin film materials is that they tend to be more chemically reactive than fully oxidized or fully nitrided compounds. Often, a sub-stoichiometric layer in an optical stack will oxidize, particularly if the stack is heated or subjected to water or corrosive chemicals. Oxidation can result in a change in the layer's n and k values, which will change the spectral characteristics of an optical stack.

There is a need to stabilize the properties of optical stacks, particularly optical stacks containing sub-stoichiometric layers. This is particularly true when the stack is heated in an annealing or substrate tempering process.

SUMMARY OF THE INVENTION

The present invention provides an optical stack containing a sub-stoichiometric dielectric layer whose characteristics are controlled to stabilize the optical properties (e.g., transmission and reflection) of the stack.

In embodiments, the sub-stoichiometric layer can be directly contacted on one or both sides by a stabilizing or cladding layer that functions to stabilize the chemistry of the sub-stoichiometric layer. The stabilization function occurs, e.g., when the optical stack is exposed to elevated temperatures that would normally cause the sub-stoichiometric dielectric layer to react in air or another atmosphere. By hindering reaction of the sub-stoichiometric layer and stabilizing the chemistry of the optical stack, the stabilizing layer(s) can stabilize the optical properties of the stack, particularly when the sub-stoichiometric layer serves a primarily optical interference function in the stack.

In other embodiments, the composition and thickness of a sub-stoichiometric layer can be chosen so that reaction of the sub-stoichiometric layer with air or another atmosphere upon heating brings about a change in an optical property (e.g., optical absorption) that exactly balances the change in that property by the rest of the optical stack, so that the stack exhibits zero net change in the optical property.

BRIEF DESCRIPTION OF THE DRAWINGS

The preferred embodiments of this invention will be described in detail with reference to the following figures.

DETAILED DESCRIPTION OF PREFERRED EMBODIMENTS

Figure 1:
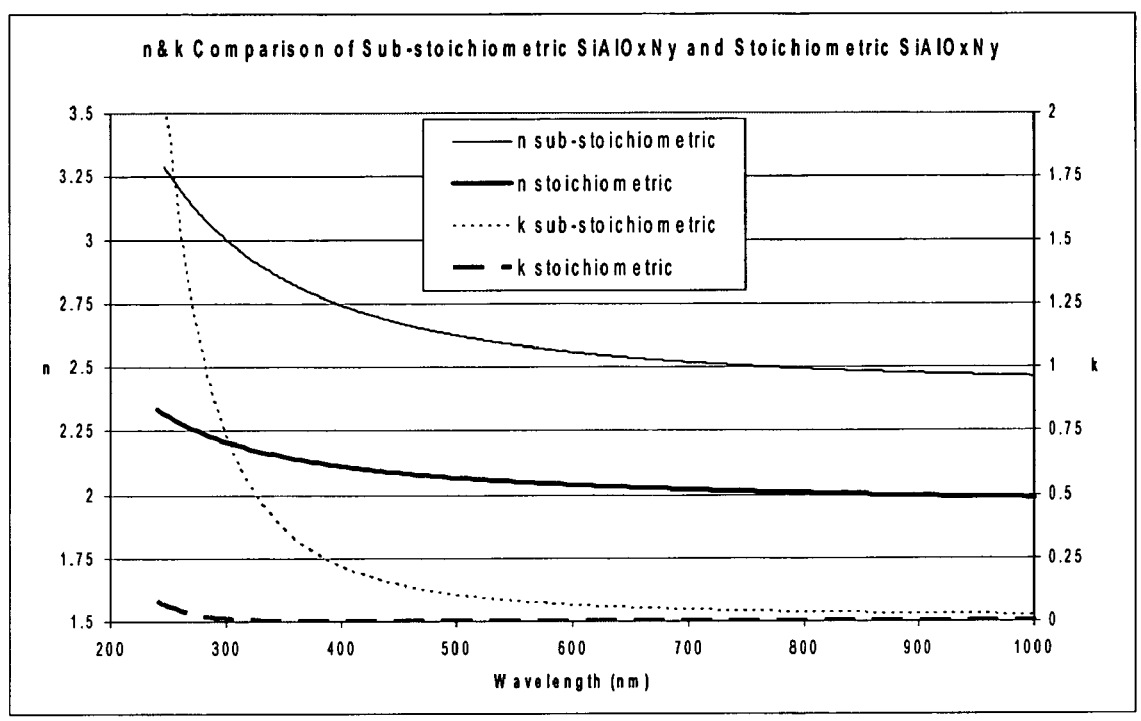
FIG. 1 shows index of refraction ("n") and extinction coefficient ("k") values for silicon aluminum nitride sputtered from a target of silicon containing 10 weight % aluminum in nitrogen sputtering gas.

The present invention provides sub-stoichiometric layers, alone or in combination with one or more stabilizing layers, that can stabilize the optical properties of an optical stack, particularly during heating and tempering.

Due to process limitations, multi-element compounds are rarely deposited in thin film layers with the exact ratio of elements dictated by stoichiometry.

In light of this, the term "stoichiometric" as used herein refers to an oxide, nitride or oxynitride, of one or more elements, in which the atomic ratio of oxygen and/or nitrogen relative to the other elements is within ±5% of the atomic ratio of oxygen and/or nitrogen in an oxide, nitride or oxynitride compound of the one or more elements. For example, "stoichiometric" tin oxide refers herein to $SnO_x$, where $1.9 \leq x \leq 2.1$. "Stoichiometric" silicon nitride refers herein to $Si_3N_y$, where $3.8 \leq y \leq 4.2$. A "stoichiometric" oxynitride of Si-10 wt % Al refers herein to $(Si_{0.9}Al_{0.1})_3(O_xN_y)_w$, where x+y=1; as x approaches 1, w approaches 6; and as y approaches 1, w approaches 4.

The term "sub-stoichiometric" as used herein refers to an oxide, nitride or oxynitride, of one or more elements, in which the atomic ratio of oxygen and/or nitrogen relative to the other elements is less than 95% and at least 30% of the atomic ratio of oxygen and/or nitrogen in the oxide, nitride or oxynitride compound of the one or more elements. For example, a "sub-stoichiometric" tin oxide refers herein to $SnO_x$, where $0.6 \leq x < 1.9$. "Sub-stoichiometric" silicon nitride refers herein to $Si_3N_y$, where $1.2 \leq y < 3.8$.

The atomic ratio of oxygen and/or nitrogen in a stoichiometric or sub-stoichiometric layer can be determined using various techniques well known in the art. For example, measurements of n and k can be used to make an estimation of stoichiometry. Values of n and k for many stoichiometric oxides and nitrides are well documented in the literature and easily verified. n and k values for some standard samples of specific sub-stoichiometric materials can also be easily obtained. Comparison of these values with those of a particular stoichiometric or sub-stoichiometric layer can indicate the atomic ratio of oxygen and/or nitrogen in the particular layer. Surface analysis techniques such as x-ray photoelectron spectroscopy (XPS) and Rutherford backscattering (RBS) can also be used to determine stoichiometry.

The term "dielectric" as used herein refers to an oxide, nitride or oxynitride material, which can be "stoichiometric" or "sub-stoichiometric", that is at least partially transparent to visible light and creates interference effects in thin films.

The term "homogeneous" as used herein describes a layer that does not have a gradient in chemical composition extending from one surface of the layer to the other surface of the layer. Thus, the term "homogeneous" describes a layer consisting of a single compound. The term "homogeneous" also describes a layer consisting of a uniform mixture of two or more different compounds.

In embodiments, the present invention provides an optical stack having a sub-stoichiometric dielectric layer in contact with one or two stabilizing layers. Preferably the stabilizing layers are in direct contact with the sub-stoichiometric layer.

The sub-stoichiometric layer is a sub-stoichiometric dielectric composition that can result from the reaction of oxygen and/or nitrogen with at least one metal element or semiconductor element. Suitable metal elements include transition metals, Mg, Zn, Al, In, Sn, Sb and Bi. Preferably, the metal elements include Mg, Y, Ti, Zr, Nb, Ta, W, Zn, Al, In, Sn, Sb and Bi. Suitable semiconductor elements include Si and Ge. The sub-stoichiometric layer can be doped with oxides, nitrides and oxynitrides of elements such as Ti, Fe and Cu that raise the n and k of the layer. Co-sputtering the dopants and the host material may produce a layer having a non-homogeneous composition, e.g, a layer in which the dopant concentration varies from top to bottom. Preferably, the sub-stoichiometric layer has a homogeneous composition.

The sub-stoichiometric layer preferably functions in an optical stack primarily as an optical interference layer. The sub-stoichiometric layer can have a thickness in a range of from 10 to 100 nm, preferably from 15 to 80 nm, more preferably from 25 to 70 nm. If the sub-stoichiometric layer is less than 10 nm thick, then it may not sufficiently influence the optical interference. If the sub-stoichiometric layer is more than 100 nm thick, then it may absorb too much visible light and darken the optical stack.

As discussed above, the sub-stoichiometric dielectric layer can be in direct contact with one or two stabilizing layers. Materials that can be used in the stabilizing layer are those that reduce chemical and optical changes in the adjacent sub-stoichiometric layer upon exposure to heat. Preferably each stabilizing layer has a homogenous composition.

A stabilizing layer can be a metallic material that would tend to oxidize to a substantially transparent compound during a heating process in an oxygen-containing atmosphere. A metal stabilizing layer can comprise, e.g., Ti, Zr, Hf, Nb, Ta, Mo, W, Al, or Mg, and alloys, aluminides and silicides of these elements.

A stabilizing layer can also be a sub-stoichiometric dielectric. When the stabilizing layer is a sub-stoichiometric dielectric, the stabilizing layer has a different composition than that of the sub-stoichiometric layer contacted by the stabilizing layer. The sub-stoichiometric stabilizing layer upon heating may retain its sub-stoichiometric state or may oxidize to a more stoichiometric state.

Preferably, the stabilizing layer is a stoichiometric dielectric. A stoichiometric stabilizing layer can be a fully reacted version of the sub-stoichiometric layer contacted by the stabilizing layer, with the metal and/or semiconductor elements in the oxides, nitrides or oxynitrides of the stoichiometric layer being in their highest oxidation state (e.g., $Nb_2O_5$, with $Nb^{5+}$). Alternatively, the stabilizing layer can be a stoichiometric version of the oxides, nitrides or oxynitrides of the sub-stoichiometric layer in which the elements are not in their highest oxidation state (e.g., $NbO_2$, with $Nb^{4+}$). The stabilizing layer can also be a stoichiometric, partially or fully reacted, oxide, nitride or oxynitride of different elements than those present in the sub-stoichiometric layer.

The stoichiometric stabilizing layer(s) can be more or less absorbing to visible light than the sub-stoichiometric layer. Many elements, such as Mg, Y, Ti, Zr, Nb, Ta, W, Zn, Al, In, Sn, Sb, Bi and Ge, form sub-stoichiometric oxides, nitrides and oxynitrides that are more optically absorbing to visible light than is the most fully reacted stoichiometric oxide, nitride or oxynitride of the element. In contrast, some metals, such as Cr, Fe, Ni and Cu, have more than one stoichiometric oxidation state, and in some cases the most oxidized state is not the least absorbing to visible light. Heating a thin film of these oxides, and subsequently causing further oxidation, can result in a more optically absorbing layer. For example, $Cu_2O$ and CuO are the two stoichiometric oxides of copper, and $Cu_2O$ is the least absorbing in the visible wavelengths.

Oxides of Mg, Y, Ti, Zr, Nb, Ta, W, Zn, Al, In, Sn, Sb, Bi and Ge tend to have an extinction coefficient k of close to zero (essentially non-absorbing) throughout the visible wavelengths in the fully oxidized state. Nitrides of Al and Si follow the same trend. This non-absorbing characteristic makes stabilizing layers of these materials very useful in optical stacks. For many optical designs, absorption is highly undesirable. However, there are some optical designs where absorption is acceptable or desirable.

FIG. 1 compares index of refraction and extinction coefficient values for sub-stoichiometric and stoichiometric $SiAlO_xN_y$ sputtered films. FIG. 1 shows that sub-stoichiometric $SiAlO_xN_y$ has a higher index of refraction and higher extinction coefficient than stoichiometric $SiAlO_xN_y$.

The stabilizing layer functions primarily to chemically stabilize the sub-stoichiometric layer. Preferably, the stabilizing layer(s) in contact with the sub-stoichiometric layer allow the sub-stoichiometric layer to be heated to a temperature of 600° C., more preferably 700° C., even more preferably 800° C., for 4 to 5 minutes with little or no change in optical properties.

A stabilizing, or cladding, layer can have a thickness in a range of from 1 to 10 nm, preferably 2 to 8 nm, more preferably from 2 to 5 nm.

In embodiments, the index of refraction of the sub-stoichiometric layer can be at least 1.8 (i.e., n≧1.8), preferably at least 2.3 (i.e., n≧2.3). The extinction coefficient of the sub-stoichiometric layer, k, can be in a range of 0.03≦k≦0.15.

The oxide, nitride or oxynitride of the sub-stoichiometric layer dielectric can have a higher index of refraction than the stabilizing layer(s) and can be thicker than the one or more stabilizing layers. This can result in a combination of sub-stoichiometric and stoichiometric layers with a higher index of refraction than a stoichiometric layer of the same thickness as the combination.

Alternatively, the oxide, nitride or oxynitride of the sub-stoichiometric layer dielectric can have a lower index of refraction than the stabilizing layer(s). The combination with one or more stabilizing layers with such a low index sub-stoichiometric layer can create the equivalent of a layer having a much higher index of refraction than the sub-stoichiometric layer.

When the sub-stoichiometric layer is sandwiched between two stabilizing layers, the two stabilizing layers can have the same or different compositions, and the same or different thicknesses.

The optical stack of the present invention can be made by conventional thin film deposition techniques, such as sputtering, in which laminates of various layers are formed by vapor depositing the layers sequentially.

Figure 2:
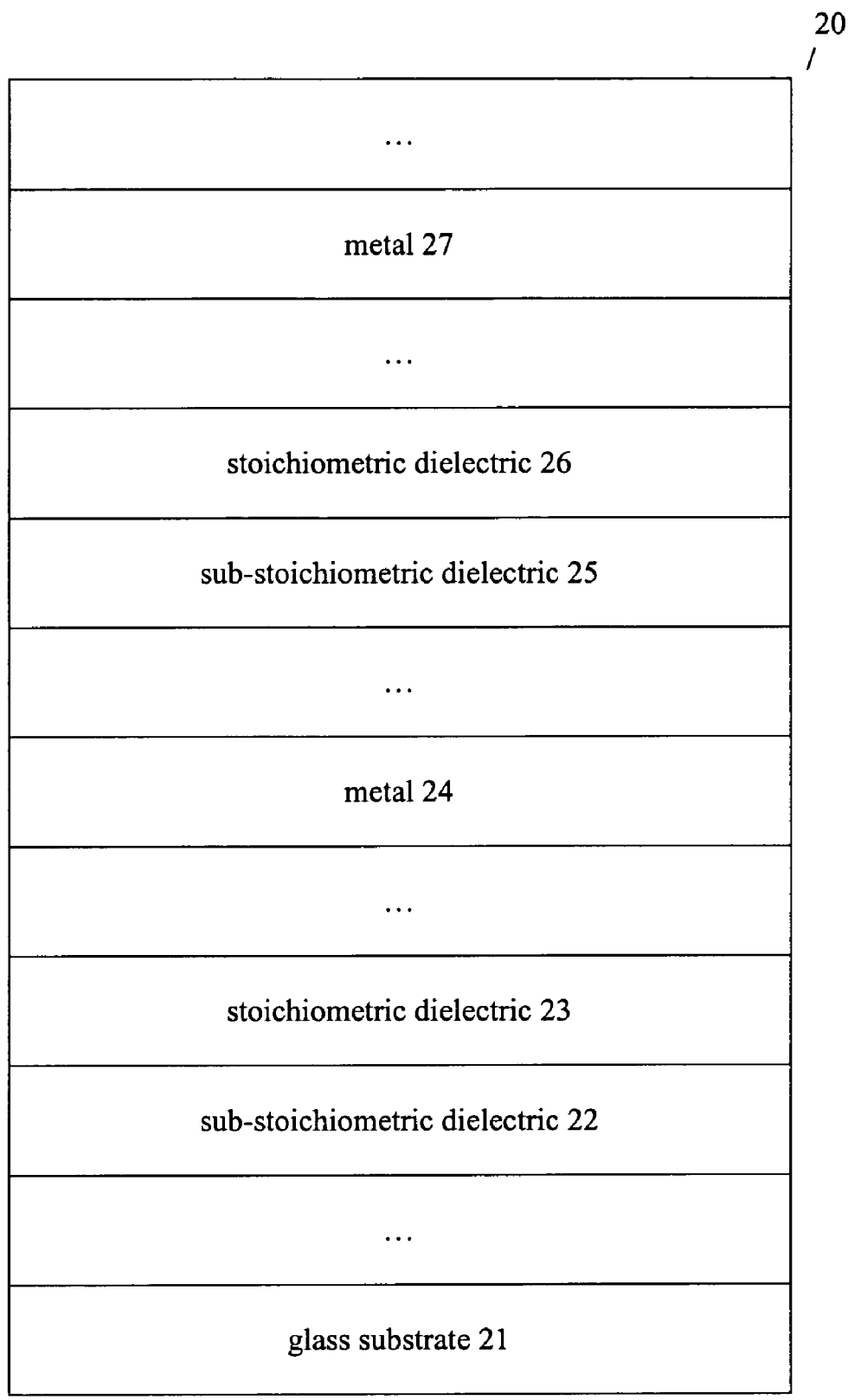
FIG. 2 shows an optical stack including a sub-stoichiometric dielectric layer in direct contact with a stoichiometric dielectric stabilizing layer.

Optical stacks of various metal and dielectric layers can reduce the emissivity of transparent substrates, such as glass. FIG. 2 illustrates a low-emissivity ("low-e") optical stack 20 deposited on a glass substrate 21. The optical stack 20 includes metal layers 24 and 27, which can comprise an infrared radiation reflecting metal such as Ag, Cu or Au. Between glass substrate 21 and metal layer 24 is sub-stoichiometric dielectric layer 22 in direct contact with stoichiometric dielectric layer 23. Between metal layers 24 and 27 is sub-stoichiometric dielectric layer 25 in direct contact with stoichiometric dielectric layer 26.

Figure 3:
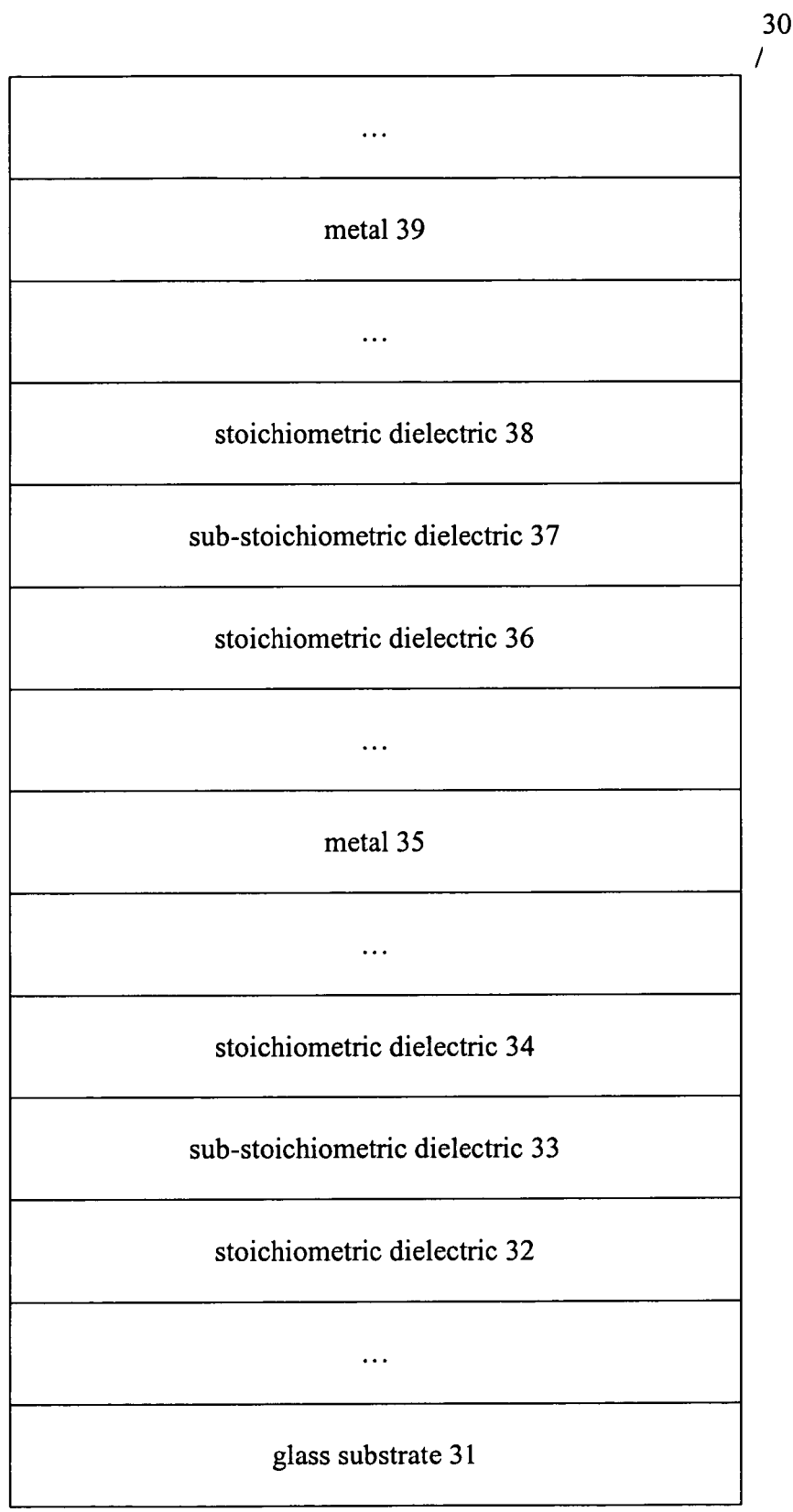
FIG. 3 shows an optical stack including a sub-stoichiometric dielectric layer sandwiched between and in direct contact with two stoichiometric dielectric stabilizing layers.

FIG. 3 illustrates a low-e optical stack 30 deposited on a glass substrate 31. The optical stack 30 includes metal layers 35 and 39, which can comprise an infrared radiation reflecting metal such as Ag, Cu or Au. Between glass substrate 31 and metal layer 35 is sub-stoichiometric dielectric layer 33 sandwiched between and in direct contact with stoichiometric dielectric layers 32 and 34. Between metal layers 35 and 39 is sub-stoichiometric dielectric layer 37 sandwiched between and in direct contact with stoichiometric dielectric layers 36 and 38.

In FIGS. 2 and 3, the designation " . . . " indicates the presence of one or more unspecified layers.

In other embodiments of the present invention, an optical stack is provided in which the composition and thickness of the sub-stoichiometric layer is chosen so that the change in optical properties of the sub-stoichiochiometric layer upon heating offsets the change in optical properties of the remainder of the stack. Upon heating during tempering, some sub-stoichiometric materials, such as sputtered sub-stoichiometric $NiCrO_x$, become more absorbing to visible light and exhibit an increase in index of refraction. In contrast, most low-e optical stacks become more transparent and lighten during tempering. Selection, by techniques well known in the art, of a suitable thickness of a suitable sub-stoichiometric material that becomes more absorbing to visible light upon heating will allow optical stacks to be designed that when heated during tempering undergo an absolute change in transmission (change in % TY) of 1.00% or less, preferably 0.50% or less, more preferably 0.25% or less (i.e., a change in transmission of ±1.00% or less, ±0.50% or less, or ±0.25% or less, respectively). Sub-stoichiometric $NiCrO_x$ having a thickness of from 2 to 20 nm, preferably 3 to 12 nm, can be used to counter the increase in transmission on heating. If the $NiCrO_x$ layer is too thin, then it will be unable to counter the transmission changes in the other stack layers. If $NiCrO_x$ is too thick, it will overcome the transmission increase of the other stack layers and the optical stack will overall become less transparent and darken upon tempering. The thickness of the $NiCrO_x$ can be designed to exactly balance the tendency of the other layers to lighten and create a zero tempering transmission change. Preferably the sub-stoichiometric $NiCrO_x$ layer is homogeneous.

EXAMPLES

Examples of low-e coatings on glass utilizing the present invention are shown in the examples below. Dielectric coatings were formed by midfrequency (~30 kHz), dual magnetron sputtering onto room temperature substrates. $SiAlO_xN_y$ was sputtered from a SiAl target in an $Ar/O_2/N_2$ atmosphere. ZnO was sputtered from a Zn target in an $Ar/O_2$ atmosphere. $(Si_{0.9}Al_{0.1})O_xN_y$ was sputtered from a target containing Si and 10 wt % Al. Ag was DC sputtered from an Ag target in an Ar atmosphere. $NiCrO_x$ was DC sputtered from a NiCr target in an $Ar/O_2$ atmosphere.

The stoichiometry of oxides, nitrides and oxynitrides was controlled by controlling the compositions of the sputtering target and the sputtering atmosphere. Optical transparency was used to confirm the stoichiometry of stoichiometric nitrides containing silicon and stoichiometric oxynitrides containing silicon.

Example 1

A comparison was made of the change in optical properties upon tempering of a sub-stoichiometric $SiAlO_xN_y$ layer not in contact with a stabilizing stoichiometric $SiAlO_xN_y$ layer relative to the same sub-stoichiometric $SiAlO_xN_y$ layer when in direct contact with a stabilizing stoichiometric $SiAlO_xN_y$ layer.

In this comparison, low-e optical stacks containing a single Ag layer were deposited on soda-lime glass substrates (5 cm×5 cm×0.3 cm). Tables 1 and 2 show the numerical order in which various layers were deposited. Table 1 shows the deposition conditions used to form an optical stack in which the sub-stoichiometric $SiAlO_xN_y$ layer was not in contact with a stabilizing stoichiometric $SiAlO_xN_y$ layer. Table 2 shows the deposition conditions used to form another optical stack in which the sub-stoichiometric $SiAlO_xN_y$ layer was in direct contact with a stabilizing stoichiometric $SiAlO_xN_y$ layer.

The size of each of the two sputtering targets used to deposit $SiAlO_xN_y$ by dual magnetron sputtering was 1 m×110 mm, for an effective target surface area of 0.11 m². The $SiAlO_xN_y$ was sputtered at a power of 17.8-18.0 kW, for a power density of about 16.3 W/cm². Sub-stoichiometric $SiAlO_xN_y$ was obtained by sputtering with a $N_2$ gas flow of 83 sccm. Stoichiometric SiAlO$_x$N$_y$ was obtained by sputtering with a N$_2$ gas flow of 98 sccm.

TABLE 1

| No. | Layer | Gas Flow | | | AC Power (kW) |
|---|---|---|---|---|---|
| | | Ar (sccm) | O$_2$ (sccm) | N$_2$ (sccm) | |
| 1 | SiAlO$_x$N$_y$(*) | 100 | 10 | 83 | 17.8 |
| 2 | ZnO | 50 | 165 | 0 | 14.4 |
| 3 | Ag | 33 | 3 | — | — |
| 4 | NiCrO$_x$ | 50 | 37 | — | — |
| 5 | SiAlO$_x$N$_y$ | 100 | 10 | 98 | 17.9 |

*Sub-stoichiometric SiAlO$_x$N$_y$

TABLE 2

| No. | Layer | Gas Flow | | | AC Power (kW) |
|---|---|---|---|---|---|
| | | Ar (sccm) | O$_2$ (sccm) | N$_2$ (sccm) | |
| 1 | SiAlO$_x$N$_y$(**) | 100 | 10 | 98 | 17.9 |
| 2 | SiAlO$_x$N$_y$(*) | 100 | 10 | 83 | 18 |
| 3 | ZnO | 50 | 165 | 0 | 14.4 |
| 4 | Ag | 33 | 3 | — | — |
| 5 | NiCrO$_x$ | 50 | 37 | — | — |
| 6 | SiAlO$_x$N$_y$ | 100 | 10 | 98 | 17.9 |

*Sub-stoichiometric SiAlO$_x$N$_y$
**Stabilizing stoichiometric SiAlO$_x$N$_y$

The coated substrates were tempered in a muffle furnace at 730° C. for 4 minute.

Table 3 shows the color change (ΔE) that resulted from the tempering. ΔE (Lab) is the color change including L, a* and b* values. ΔE(ab) is the color change including color only (a* and b*) but not intensity (L).

TABLE 3

| | Table 1 stack (no stabilizing layer) | | Table 2 stack (with stabilizing layer) | |
|---|---|---|---|---|
| | ΔE(Lab) | ΔE(ab) | ΔE(Lab) | ΔE(ab) |
| T | 2.0 | 1.5 | 2.3 | 1.5 |
| Rg | 3.6 | 3.6 | 3.1 | 3.0 |
| Rf | 4.4 | 4.4 | 3.7 | 3.7 |

T = transmission
Rg = glass (uncoated) side reflected color
Rf = thin film coated side reflected color Table 3 shows that the transmission color change was not decreased by the stabilizing stoichiometric SiAlO$_x$N$_y$ layer. In contrast, Table 3 shows that the reflected color change was decreased by the addition of the stabilizing stoichiometric SiAlO$_x$N$_y$ layer in direct contact with the sub-stoichiometric SiAlO$_x$N$_y$ layer. In particular, the decrease in glass side reflected color change (i.e., Rg ΔE) was 0.5 to 0.6 color units. Table 3 shows that the properties of an optical stack including a sub-stoichiometric SiAlO$_x$N$_y$ layer can be stabilized by directly cladding the sub-stoichiometric SiAlO$_x$N$_y$ layer with a stabilizing stoichiometric SiAlO$_x$N$_y$ layer.

Example 2

Two single silver low-emissivity optical stacks were made. The first stack had a single sub-stoichiometric (Si$_{0.9}$Al$_{0.1}$)O$_x$N$_y$ bottom dielectric. The second stack had a thermally stabilizing stoichiometric (Si$_{0.9}$Al$_{0.1}$)O$_x$N$_y$ layer between the sub-stoichiometric (Si$_{0.9}$Al$_{0.1}$)O$_x$N$_y$ and the glass substrate. On top of each stack were identical (Si$_{0.9}$Al$_{0.1}$)O$_x$N$_y$ layers. The complete stack designs are shown below:

First Stack:
Glass/sub-stoichiometric (Si$_{0.9}$Al$_{0.1}$)O$_x$N$_y$/ZnO/Ag/NiCrO$_x$/(Si$_{0.9}$Al$_{0.1}$)O$_x$N$_y$ Second Stack:
Glass/stoichiometric (Si$_{0.9}$Al$_{0.1}$)O$_x$N$_y$/sub-stoichiometric (Si$_{0.9}$Al$_{0.1}$)O$_x$N$_y$/ZnO/Ag/NiCrO$_x$/(Si$_{0.9}$Al$_{0.1}$)O$_x$N$_y$ Both samples were tempered and checked for color change from tempering. The color change expressed as ΔE a* b* was calculated by the following equation:

$$\Delta E\, a^*b^* = [(a^*_{BB} - a^*_{AB})^2 + (b^*_{BB} - b^*_{AB})^2]^{0.5}$$

where BB refers to color before tempering and AB refers to color after tempering.

The tempering color change for transmission (T ΔE a* b*), glass side reflection (Rg ΔE a* b*) and film (i.e., stack) side reflection (Rf ΔE a* b*) are shown in the following Table 4.

TABLE 4

| | First stack: without stoichiometric (Si$_{0.9}$Al$_{0.1}$)O$_x$N$_y$ stabilization layer | Second stack: with stoichiometric (Si$_{0.9}$Al$_{0.1}$)O$_x$N$_y$ stabilization layer |
|---|---|---|
| T ΔE a* b* | 1.5 | 1.5 |
| Rg ΔE a* b* | 3.6 | 3.0 |
| Rf ΔE a* b* | 4.4 | 3.7 |

Table 4 shows that the addition to the second stack of the protective stabilizing layer of stoichiometric (Si$_{0.9}$Al$_{0.1}$)O$_x$N$_y$ resulted in a reduction in tempering color shift for both glass side reflection and film (optical stack) side reflection.

In embodiments of the present invention, the stabilizing layer results in a tempering color shift for glass side reflection of 4.0 or less, preferably 3.5 or less, more preferably 3.0 or less, even more preferably 2.5 or less. In addition, the stabilizing layer results in a tempering color shift for film (optical stack) side reflection of 4.0 or less, preferably, 3.5 or less, more preferably 3.0 or less, even more preferably 2.5 or less.

Example 3

The following optical stack was prepared:

6 mm glass substrate/20 nm stoichiometric SiAlO$_x$N$_y$/8 nm ZnO/12 nm Ag/2 nm NiCrO$_x$/5 nm stoichiometric SiAlO$_x$N$_y$/55 nm sub-stoichiometric SiAlO$_x$N$_y$/5 nm stoichiometric SiAlO$_x$N$_y$/8 nm ZnO/15 nm Ag/2 nm NiCrO$_x$/36 nm stoichiometric SiAlO$_x$N$_y$ The SiAlO$_x$N$_y$ was sputtered from a target containing Si and 10 wt % Al.

In this optical stack the middle dielectric (i.e. stoichiometric SiAlO$_x$N$_y$/sub-stoichiometric SiAlO$_x$N$_y$/stoichiometric SiAlO$_x$N$_y$) is primarily a higher index version of SiAlO$_x$N$_y$. This allows a lower physical thickness for the layer and a higher sputtering rate in the deposition process.

The middle dielectric combination was deposited under the conditions shown in Table 5.

TABLE 5

| | Gas Flow | | | |
|---|---|---|---|---|
| | Ar (sccm) | $O_2$ (sccm) | $N_2$ (sccm) | AC Power (kW) |
| Stoichiometric $SiAlO_xN_y$ | 100 | 10 | 90 | 14.2 |
| Sub-stoichiometric $SiAlO_xN_y$ | 100 | 10 | 83.5 | 14.2 |

The color of the optical stack is very sensitive to the index and optical thickness of the middle layers. Normally, glass tempering at a temperature of 730° C. for 4 minutes would change the index and optical thickness. However, this change is reduced by the stabilizing stoichiometric layers clad on both sides of the sub-stoichiometric layer.

Example 4

Tin zinc oxide ($SnZnO_x$) is a common dielectric material used in temperable low-emissivity designs. For creating certain optical effects in thin film designs, $SnZnO_x$ can be deposited in a sub-stoichiometric state.

An investigation was carried out to determine if optically absorbing, sub-stoichiometric $SnZnO_yN_x$ could be thermally stabilized using stoichiometric $SiAlO_yN_x$ layers. Thin film structures were formed on quartz substrates as illustrated in the following Table 6.

TABLE 6

| Sample | Layer 1 5 nm thick | Layer 2 25 nm thick | Layer 3, 5 nm thick |
|---|---|---|---|
| 1 | $SiAlO_xN_y$** | $SnZnO_xN_y$* | $SiAlO_xN_y$** |
| 2 | $SiAlO_xN_y$** | $SnZnO_xN_y$* | |
| 3 | | $SnZnO_xN_y$* | $SiAlO_xN_y$** |
| 4 | | $SnZnO_xN_y$* | |

*Sub-stoichiometric
**Stabilizing stoichiometric

The layers were sputtered from 1 meter long Twin-Mag targerts. Nitrogen was added to the sub-stoichiometric $SnZnO_xN_y$ to stabilize the sputtering process and reduce arcing. Run conditions for the $SiAlO_xN_y$ and the $SnZnO_xN_y$ are shown in the following Table 7.

TABLE 7

| Layer | Ar flow (sccm) | $O_2$ flow (sccm) | $N_2$ flow (sccm) | Line speed (m/min) | Thick (nm) | AC power (kW) | I (amps) | V (volts) | Pressure (mbar) |
|---|---|---|---|---|---|---|---|---|---|
| $SiAlO_yN_x$ | 100 | 10 | 115 | 7.562 | 5 | 17.1 | 27.2 | 831 | 6.1E−3 |
| $SnZnO_yN_x$ | 80 | 176 | 60 | 3.267 | 25 | 11.9 | 14.6 | 471 | 5.7E−3 |

After the four samples were deposited, percent optical absorption was measured in the visible wavelengths before and after baking. Baking was done at 670° C. for 5 minutes. The change in percent optical absorption from the samples before bake to after bake at a wavelength of 400 nm is shown in Table 8 below.

TABLE 8

| Layer Structure | Change in percent absorption at 400 nm wavelength |
|---|---|
| $SnZnO_xN_y$* | −5.4 |
| $SiAlO_xN_y$**/$SnZnO_xN_y$* | −2.01 |
| $SnZnO_xN_y$*/$SiAlO_xN_y$** | −4.18 |
| $SiAlO_xN_y$**/$SnZnO_xN_y$*/$SiAlO_xN_y$** | −2.84 |

*Sub-stoichiometric
**Stabilizing stoichiometric

Table 8 shows that the absorption decrease due to heating was less for the samples with a stoichiometric $SiAlO_xN_y$ layer.

A similar investigation was made to determine if stoichiometric $SnZnO_x$ layers would stabilize optically absorbing, sub-stoichiometric $SnZnO_xN_y$. In these stacks, the decrease in absorption with heating was the same with and without the $SnZnO_x$ layers.

Example 5

Double silver low emissivity stacks with two $NiCrO_x$ layers were made as shown below:

Glass/$SiAlO_xN_y$/ZnO/Ag/$NiCrO_x$/$SiAlO_xN_y$/ZnO/Ag/$NiCrO_x$/$SiAlO_xN_y$

In one version of the stack, the $NiCrO_x$ layers were approximately 2 nm thick. In a second version of the stack, the $NiCrO_x$ layers were approximately 4 nm thick. Optical transmission (TY) was measured before and after baking the stacks at 730° C. for four minutes. The results are shown in the following Table 9.

TABLE 9

| DC power (kW) | Ar flow (sccm) | O2 flow (sccm) | Transport speed (m/min) | Estimated $NiCrO_x$ thickness (nm) | TY before tempering (%) | TY after tempering (%) | ΔTY |
|---|---|---|---|---|---|---|---|
| 3.67 | 50 | 37 | 8 | 2 | 75.13 | 80.50 | 5.37 |
| 3.67 | 50 | 37 | 4 | 4 | 75.25 | 77.27 | 2.02 |

Table 9 shows that the optical stack with the thicker $NiCrO_x$ has a smaller transmission change (ΔTY) upon heating. The decrease in ΔTY with increase in $NiCrO_x$ thickness indicates that $NiCrO_x$ decreases in transmission and becomes more optically absorbing upon heating.

Example 6

Figure 4:
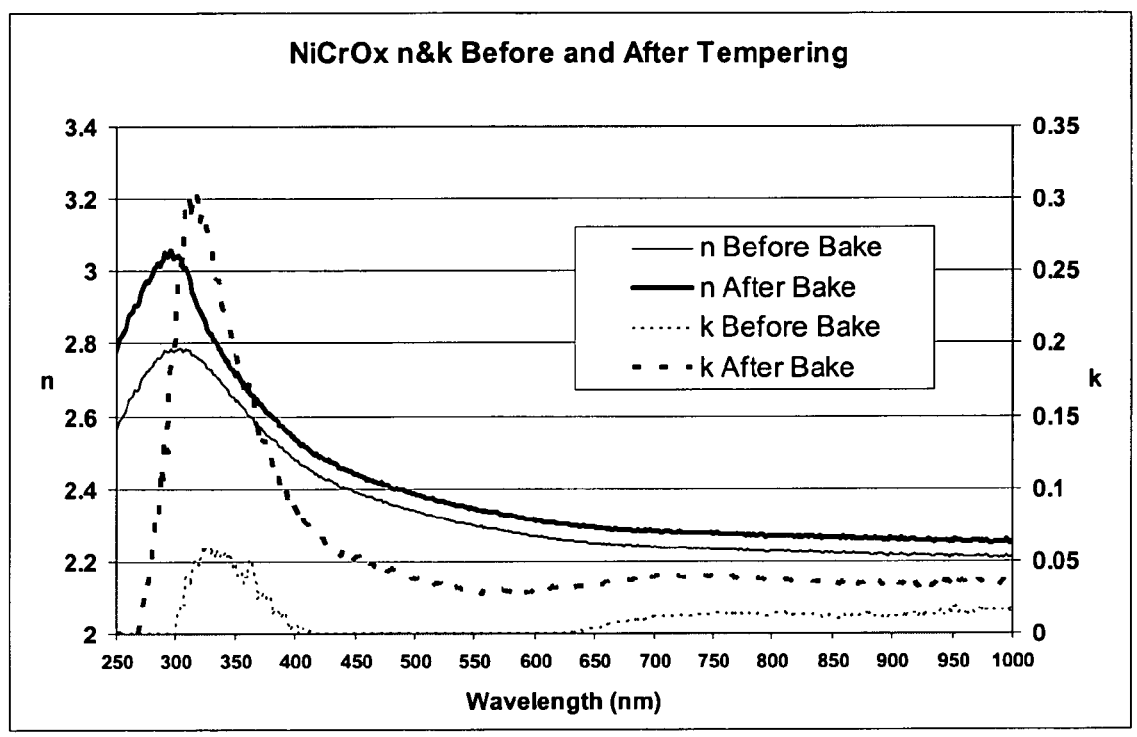
FIG. 4 shows index of refraction, n, and extinction coefficient, k, for a 39 nm thick $NiCrO_x$ sample before and after heating at 730° C. for four minutes in air.

The index of refraction, n, and extinction coefficient, k, of a 39 nm thick $NiCrO_x$ film deposited on a quartz subtrate were measured as a function of wavelength using a Woollam M2000U Ellipsometer before baking. After baking at 730° C. for four minutes in air, the optical constants were measured again. As shown in FIG. 4, both n and k for the $NiCrO_x$ were increased by the heating.

Example 7

Four single silver low-emissivity optical stacks were made in which only the thickness of the NiCrOx barrier layer, deposited on the Ag layer, was varied. The optical stacks had the following general design:

Glass/3.5 nm stoichiometric $SiAlO_xN_y$/17 nm sub-stoichiometric $SiAlO_xN_y$/6 nm ZnO/13.4 nm Ag/$NiCrO_x$/38 nm stoichiometric $SiAlO_xN_y$ The $NiCrO_x$ was reactively DC sputtered from 1 meter long 80 wt % Ni-20 wt % Cr target. The $SiAlO_xN_y$ was sputtered from a target containing Si and 10 wt % Al. The sputtering conditions are shown in the following Table 10.

TABLE 10

| | | $NiCrO_x$ Sputtering Conditions | | | |
|---|---|---|---|---|---|
| Ar flow (sccm) | O$_2$ flow (sccm) | DC power (kW) | Current (amps) | Target Voltage | Sputtering Pressure (mbar) |
| 50 | 37 | 2.23 | 3.6 | 624 | 1.18E−3 |

In the standard or control stacks, the $NiCrO_x$ layers were approximately 2 nm thick. The thickness of the $NiCrO_x$ layer was increased in the other stacks.

The stacks were tempered by heating in air at 670° C. for 6 minutes, 20 seconds.

The transmission (% TY) was measured before and after heating. The results are shown in the following Table 11 and in FIG. 5.

TABLE 11

| NiCrOx Thickness (nm) | Before Temper % TY | After Temper % TY | Delta TY (change in % TY) |
|---|---|---|---|
| 2.2 | 82.1 | 85.6 | 3.5 |
| 2.2 | 82.3 | 85.6 | 3.4 |
| 4.3 | 81.8 | 83.1 | 1.3 |
| 8.7 | 79.7 | 80.1 | 0.5 |
| 17.4 | 73.5 | 71.8 | −1.7 |

Figure 5:
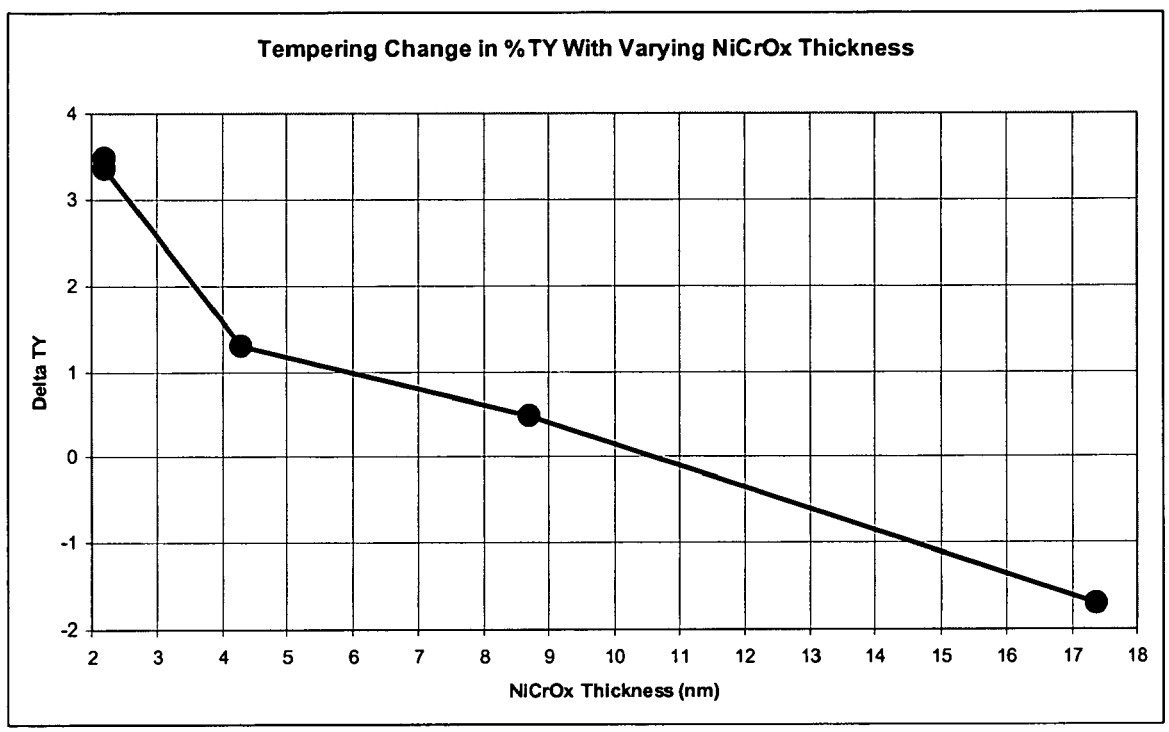
FIG. 5 shows the change in transmission (Delta % TY) upon tempering of a single silver, low-emissivity optical stack containing a NiCrOx layer as a function of the NiCrOx layer thickness.

Table 11 and FIG. 5 show that the change in % TY upon tempering decreased with increasing $NiCrO_x$ thickness and became negative above a $NiCrO_x$ thickness of about 10.5 nm. These results predict that a $NiCrO_x$ thickness of about 10.5 nm in the optical stack will result in an optical stack that exhibits zero transmission change upon tempering. These results also indicate that zero transmission change upon tempering can be achieved in optical stacks containing two or more silver layers by proper selection of $NiCrO_x$.

Both before and after the tempering, the optical stacks were tested for wet brush durability using a standardized procedure involving brushing under water. The brushing damage on each sample was visually quantified using a standard scale. The results are show in Table 12 below, in which "% damage" refers to the surface area damaged by brushing.

TABLE 12

| NiCrOx thickness (nm) | % damage caused by wet brushing before tempering | % damage caused by wet brushing after tempering |
|---|---|---|
| 2.2 | 0 | 40 |
| 2.2 | 0 | 40 |
| 4.3 | 0 | 10 |
| 8.7 | 0 | 2 |
| 17.4 | 0 | 0 |

Table 12 shows that before tempering the optical stacks were not damaged by the wet brushing. In contrast, after the tempering the stacks with the thinnest $NiCrO_x$ layers exhibited the most surface damage, but the amount of wet brush damage decreased with increasing $NiCrO_x$ thickness.

The disclosure herein of a range of values is a disclosure of every numerical value within that range. In addition, the disclosure herein of a genus is a disclosure of every species within the genus (e.g., the disclosure of the genus "transition metals" is a disclosure of every transition metal species, such as Nb, Ta, etc.).

While the present invention has been described with respect to specific embodiments, it is not confined to the specific details set forth, but includes various changes and modifications that may suggest themselves to those skilled in the art, all falling within the scope of the invention as defined by the following claims.

What is claimed is:

1. An optical stack comprising a sub-stoichiometric layer in direct contact with a stabilizing layer, wherein
   the sub-stoichiometric layer consists of
      a homogeneous sub-stoichiometric composition selected from the group consisting of oxides, nitrides and oxynitrides, where
      the sub-stoichiometric composition comprises at least one element selected from the group consisting of metal elements and semiconductor elements, and
      the sub-stoichiometric composition further comprises a sub-stoichiometric amount of at least one element selected from the group consisting of oxygen and nitrogen;
   the stabilizing layer comprises
      the at least one element selected from the group consisting of metal elements and semiconductor elements, and
      a stoichiometric amount of the at least one element selected from the group consisting of oxygen and nitrogen; and
   the sub-stoichiometric layer is from 10 to 100 nm thick and thicker than the stabilizing layer.

2. The optical stack according to claim 1, wherein the stabilizing layer is from 1 to 10 nm thick.

3. The optical stack according to claim 1, wherein
   the metal elements are selected from the group consisting of transition metals, Mg, Zn, Al, In, Sn, Sb and Bi; and
   the semiconductor elements are selected from the group consisting of Si and Ge.

4. The optical stack according to claim 1, wherein
   the metal elements are selected from the group consisting of Mg, Y, Ti, Zr, Nb, Ta, W, Zn, Al, In, Sn, Sb and Bi; and
   the semiconductor elements are selected from the group consisting of Si and Ge.

5. The optical stack according to claim 1, wherein the at least one element selected from the group consisting of metal elements and semiconductor elements comprises Si and Al.

6. The optical stack according to claim 1, wherein the sub-stoichiometric composition comprises at least two members of the group consisting of oxides, nitrides and oxynitrides.

7. The optical stack according to claim 1, wherein the index of refraction of the sub-stoichiometric layer is higher than the index of refraction of the stabilizing layer.

8. The optical stack according to claim 1, wherein the sub-stoichiometric layer has an index of refraction, n, such that $n \geq 2.3$.

9. The optical stack according to claim 1, wherein the sub-stoichiometric layer has an extinction coefficient, k, such that $0.03 \leq k \leq 0.15$.

10. The optical stack according to claim 1, wherein
the optical stack is on a transparent substrate;
the optical stack further comprises a metal layer; and
the sub-stoichiometric layer and the stabilizing layer are between the transparent substrate and the metal layer.

11. The optical stack according to claim 10, where the transparent substrate comprises a glass.

12. The optical stack according to claim 11, wherein
the optical stack is produced by a process comprising tempering the optical stack on the transparent substrate; and
the glass side reflection tempering color shift of the optical stack on the transparent glass substrate is 3.0 or less.

13. The optical stack according to claim 11, wherein
the optical stack is produced by a process comprising tempering the optical stack on the transparent substrate; and
the optical stack side reflection tempering color shift of the optical stack on the transparent glass substrate is 3.7 or less.

14. The optical stack according to claim 10, wherein the metal layer comprises Ag.

15. The optical stack according to claim 10, wherein
the optical stack further comprises another metal layer; and
the sub-stoichiometric layer and the stabilizing layer are between the metal layer and the other metal layer.

16. The optical stack according to claim 1, wherein
the optical stack is on a transparent substrate;
the optical stack further comprises a metal layer; and
the sub-stoichiometric layer and the stabilizing layer are outward from the substrate from the metal layer.

17. A method of making an optical stack, the method comprising
laminating a stabilizing layer and a sub-stoichiometric layer; and
producing the optical stack of claim 1.

18. An optical stack comprising a sub-stoichiometric layer sandwiched between and in direct contact with a first stabilizing layer and a second stabilizing layer, wherein
the sub-stoichiometric layer consists of
a sub-stoichiometric composition selected from the group consisting of oxides, nitrides and oxynitrides, where
the sub-stoichiometric composition comprises at least one element selected from the group consisting of metal elements and semiconductor elements, and
the sub-stoichiometric composition further comprises a sub-stoichiometric amount of at least one element selected from the group consisting of oxygen and nitrogen; and
the first stabilizing layer and the second stabilizing layer each comprises
the at least one element selected from the group consisting of metal elements and semiconductor elements, and
a stoichiometric amount of the at least one element selected from the group consisting of oxygen and nitrogen; the sub-stoichiometric layer is from 10 to 100 nm thick and thicker than both the first and second stabilizing layers.

19. The optical stack according to claim 18, wherein the first stabilizing layer and the second stabilizing layer have the same composition.

20. The optical stack according to claim 18, wherein the first stabilizing layer and the second stabilizing layer have different compositions.

21. The optical stack according to claim 18, wherein the sub-stoichiometric layer is homogeneous.

22. The optical stack according to claim 18, wherein the sub-stoichiometric composition comprises at least two members of the group consisting of oxides, nitrides and oxynitrides.

23. The optical stack according to claim 18, wherein
the metal elements are selected from the group consisting of transition metals, Mg, Zn, Al, In, Sn, Sb and Bi; and
the semiconductor elements are selected from the group consisting of Si and Ge.

24. The optical stack according to claim 18, wherein
the metal elements are selected from the group consisting of Mg, Y, Ti, Zr, Nb, Ta, W, Zn, Al, In, Sn, Sb and Bi; and
the semiconductor elements are selected from the group consisting of Si and Ge.

25. The optical stack according to claim 18, wherein the at least one element selected from the group consisting of metal elements and semiconductor elements comprises Si and Al.

26. The optical stack according to claim 18, wherein the index of refraction of the sub-stoichiometric layer is higher than the index of refraction of each of the first stabilizing layer and the second stabilizing layer.

27. The optical stack according to claim 18, wherein the sub-stoichiometric layer has an index of refraction, n, such that $n \geq 2.3$.

28. The optical stack according to claim 18, wherein the sub-stoichiometric layer has an extinction coefficient, k, such that $0.03 \leq k \leq 0.15$.

29. The optical stack according to claim 18, wherein the first stabilizing layer is from 1 to 10 nm thick.

30. The optical stack according to claim 29, wherein the second stabilizing layer is from 1 to 10 nm thick.

31. The optical stack according to claim 18, wherein
the optical stack is on a transparent substrate;
the optical stack further comprises a metal layer; and
the first stabilizing layer, the sub-stoichiometric layer, and the second stabilizing layer are between the transparent substrate and the metal layer.

32. The optical stack according to claim 31, wherein the transparent substrate comprises a glass.

33. The optical stack according to claim 31, wherein the metal layer comprises Ag.

34. The optical stack according to claim 31, wherein
the optical stack further comprises another metal layer; and
the first stabilizing layer, the sub-stoichiometric layer, and the second stabilizing layer are between the metal layer and the other metal layer.

35. The optical stack according to claim 18, wherein
the optical stack is on a transparent substrate;
the optical stack further comprises a metal layer; and
the first stabilizing layer, the sub-stoichiometric layer, and the second stabilizing layer are outward from the substrate from the metal layer.

36. A method of making an optical stack, the method comprising
laminating a first stabilizing layer, a sub-stoichiometric layer and a second stabilizing layer; and
producing the optical stack of claim 18.

* * * * *